April 1, 1969 L. S. TZENTIS 3,435,665
CAPILLARY VISCOMETER
Filed May 20, 1966
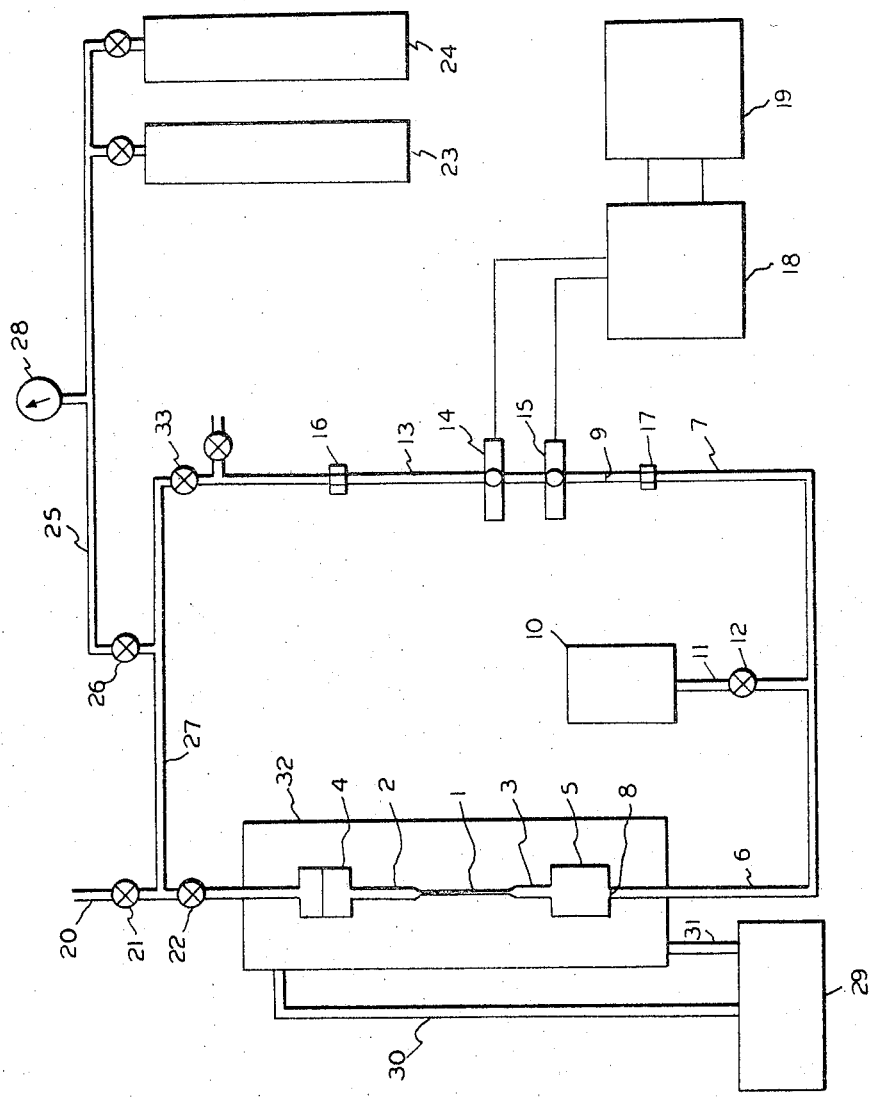
INVENTOR
LEONIDAS S. TZENTIS
BY Plumley, Tyner & Landt
ATTORNEYS

United States Patent Office 3,435,665
Patented Apr. 1, 1969

3,435,665
CAPILLARY VISCOMETER
Leonidas S. Tzentis, Williamsburg, Va., assignor to The Dow Chemical Company, Midland, Mich., a corporation of Delaware
Filed May 20, 1966, Ser. No. 551,651
Int. Cl. G01n *11/06*
U.S. Cl. 73—56                                       4 Claims

ABSTRACT OF THE DISCLOSURE

A capillary viscometer adapted to measure precisely the bulk velocity of a test fluid being forced by pressure of an inert fluid through a capillary tube connected directly to a manometer fitted with photoelectric cells for measuring the time elapse for the meniscus of the manometer fluid to pass between two spaced locations. The viscometer of this invention is particularly useful in the measurement of viscosities of non-Newtonian viscous fluids at high pressures and high shear rates.

---

This invention relates to a novel capillary viscometer for measuring the viscosity of solutions, and more particularly, it relates to a viscometer for measuring viscosities of polymer solutions while subjected to a wide range of pressure drops.

Viscometers have been employed for many years in the past to determine the viscosity and the stress-strain properties of any given liquid. Viscometers may assume any of several design features wherein some variable is measured which is dependent on the viscosity of the test solution and from which the viscosity can be calculated by known physical relationships. For example, some viscometers measure the amount of time it takes an object, such as a ball or a piston, to fall by gravity through a given linear distance of the test fluid. In another type of viscometer, an element is rotated on the test liquid and the torque required to rotate the element in the test liquid is measured and converted into units of viscosity. Still a third type of viscometer is one which employs a capillary tube through which the test liquid is forced under pressure and the time required for a given amount of the liquid to pass through the capillary can then be converted into viscosity units. The viscometer of this invention is of the capillary type.

The advantage of employing a capillary viscometer is that it has a simpler construction and operation than other types of viscometers. The chief disadvantage of the capillary viscometer is that the stress distribution in the liquid in the capillary is not uniform, which, in turn, requires that several mathematical corrections be applied to the measured values in order to obtain true stress-strain properties. The viscometer of this invention has been designed specifically for the investigation of non-Newtonian, viscous fluids operating over a wide range of shear rates. Such fluids include various oils, syrups, and polymer solutions.

It is an object of this invention to provide a novel, capillary viscometer.

It is another object of this invention to provide a capillary viscometer particularly designed to determine the viscosity of polymer solutions.

It is still another object of this invention to provide a capillary viscometer capable of measuring shear rates of non-Newtonian liquids over a wide range of pressures.

Still other objects will be apparent from the more detailed description of this invention which follows.

The foregoing objects are accomplished in accordance with this invention by providing a capillary viscometer capable of precisely measuring the bulk velocity of a test fluid, comprising a capillary tube having an upstream end and a downstream end, the upstream end being connected to a source of pressurized inert fluid and the downstream end being directly connected to the high pressure leg of a manometer filled with a suitable manometric liquid; means for introducing into said capillary tube a sample of said test fluid to be directly supported on said manometric liquid; means for controlling the temperature of said test fluid while in said capillary tube; means for controlling and measuring the pressure on said test fluid as it is being forced through said capillary tube by said inert fluid; and means for accurately measuring the velocity of the manometric liquid in the low pressure leg of the manometer as said test fluid is forced through said capillary tube by the pressure of said inert fluid. In preferred embodiments of this invention, the pressurized inert fluid is a gas, such as nitrogen, and the manometric liquid is mercury. Furthermore, the velocity of the mercury in the manometer is measured by employing two photoelectric cells spaced along the low pressure manometer leg and connected to a mechanism for measuring the exact time for the meniscus of the mercury to pass between the two cells.

A more detailed understanding of this invention may be obtained by reference to the attached drawing showing a schematic illustration of the capillary viscometer of this invention. A capillary tube 1 is connected by means of an upstream line 2 to upstream reservoir 4. Similarly, the other end of capillary tube 1 is connected to downstream line 3 and thence to downstream reservoir 5. If upstream line 2 or downstream line 3 is sufficiently large in volume, upstream reservoir 4 or downstream reservoir 5, respectively, may be eliminated. Downstream reservoir 5 is connected directly to the high pressure leg 6 of a manometer, the other leg of which being low pressure leg 7. The manometer is filled with a suitable manometric liquid such as mercury having a meniscus 8 in high pressure leg 6 and a meniscus 9 in low pressure leg 7. A supply of the manometric liquid is maintained in holder 10 and can, when desired, be fed through line 11 into the manometer by opening valve 12.

A portion of low pressure leg 7 may be made of glass or other transparent substance if the position of meniscus 9 is to be determined optically. If meniscus 9 is to be determined electrically or by other nonoptical means, low pressure leg 7 may be made of one integral piece of tubing. If transparency is desired, portion 13 may be made of a substance different from the remainder of low pressure leg 7 and joined to it by suitable seals 16 and 17. On portion 13, there are attached two movable photoelectric cells 14 and 15 spaced a convenient distance apart. Each of the two photoelectric cells 14 and 15 is connected to relay 18 and thence, in turn, to timer 19. The function of each photoelectric cell is to note the exact moment when meniscus 9 passes by. Relay 18 and timer 19 perform the function of recording those exact times. By difference, there may be obtained an exact value for the time it takes meniscus 9 to cover the distance between photoelectric cell 15 and photoelectric cell 14.

The test fluid, i.e., the fluid whose viscosity is to be measured, may be introduced, in any convenient manner, into the general region of capillary tube 1. One method of doing this is to employ feed line 20 connected through suitable valves 21 and 22 to admit the test fluid into upstream reservoir 4. Desirably, enough of the test fluid is admitted to fill a portion of upstream reservoir 4 and downstream reservoir 5 and the portions connecting those two components of the system. The total volume of test fluid may be only a few cubic centimeters in certain embodiments of this invention.

Any desirable pressure may be applied to the test liquid by the application of a pressurized inert fluid, preferably a gas, on the test liquid in upstream reservoir 4. Although any of several methods may be employed to provide enough volume of gas at any chosen pressure, one of the simplest devices is that shown in this drawing, wherein tanks 23 and 24 of high pressure, inert gas, e.g., nitrogen, are connected through line 25, valve 26, line 27 to upstream reservoir 4. By opening or closing appropriate valves in these lines, the pressure from either or both of tanks 23 and 24 may be applied to the test liquid in upstream reservoir 4. If a sufficient pressure drop is present, the test fluid is forced through capillary tube 1 causing the manometric liquid to have a corresponding movement which is transmitted to meniscus 9 to be recorded by photoelectric cells 14 and 15. The pressure employed in forcing the test liquid through capillary tube 1 can be accurately measured by one or more suitable gauges 28.

In order to provide an accurate measurement of the viscosity of the test fluid in capillary tube 1, it is necessary to maintain a constant temperature in the environment of the capillary tube. This may be accomplished by any of several well-known means, the one illustrated in this drawing being a totally enclosed test zone 32 which is filled with a heat transfer fluid circulated from heat transfer reservoir 29 through inlet line 30 to test zone 32 and back to reservoir 29 through return line 31. Suitable pumps, temperature controls, and energy input means are not shown on the drawing although they would be included in the operating system.

In the operation of the viscometer of this invention, capillary tube 1 might have an internal diameter from about 0.001" to about 0.050" with a length/diameter ($L/D$) ratio of from about 1 to about 200. It has been found that when smaller diameters and smaller $L/D$ ratios are employed, the capillary is preferably made of precious metal alloys, such as gold-platinum, while the capillaries of larger diameters and of larger $L/D$ ratios may be made of glass.

The test liquid is introduced into upstream reservoir 4 through line 20 in an amount sufficient to fill downstream reservoir 5 as well as most of upstream reservoir 4. A typical test fluid might be a solution of polyacrylonitrile in a 60% zinc chloride solution, concentrations varying from about 0.5% to about 15% by weight of polymer solids. Valve 21 is then closed, valve 22 and valve 26 are opened, and valve 33 is closed. Sufficient mercury is introduced from supply 10 through line 11 to bring meniscus 9 to a convenient location. The test fluid is then ready for the application of pressure from the pressurized fluid in tanks 23 and 24, which may be any value limited only by the strength of the entire system. Normally pressures up to about 1,000 p.s.i. are employed although the viscometer of this invention is adaptable to any higher or lower pressure. Pressure is applied to the test fluid by opening the valve on either or both of tanks 23 or 24 to admit the pressurized fluid, e.g., nitrogen, into upstream reservoir 4. The pressure forces the test liquid through capillary tube 1 causing the mercury in the manometer to move correspondingly. Low pressure leg meniscus 9 moves upward past photoelectric cell 15 and, subsequently, past photoelectric cell 14. As the meniscus passes each of these cells, an impulse is sent through relay 18 to timer 19 so that a comparison of the two times will permit an accurate measurement of the time elapsed for the passage of meniscus 9 between the two photoelectric cells. The movement of the test liquid and the mercury in the manometer is then stopped by releasing the pressure. By closing valve 22 and opening valve 33, the pressure is applied in the reverse direction to force the mercury and the test liquid back to their original positions for a subsequent measurement of viscosity. Between measurements, a suitable time is provided to assure that capillary tube 1 and the test fluid are at the correct temperature for the next measurement. The passage of test liquid through capillary tube 1 under pressure produces heat due to frictional effects and it is sometimes necessary to provide sufficient time to assure that the temperature buildup has been relieved.

From a knowledge of the exact distance between photoelectric cells 14 and 15 and the time for meniscus 9 to pass between these two cells, the velocity of the mercury can be calculated. By knowing the internal diameter of capillary tube 1 and the internal diameter of portion 13 the velocity of the test liquid in capillary tube 1 can be calculated, and by known relationships the viscosity of the test fluid can be determined therefrom.

The viscometer of this invention is capable of measuring shear rates from about 0.01 to more than 1,000,000 sec.$^{-1}$ at pressures up to 1,000 p.s.i. By using standard Newtonian oils having known viscosities ranging from about 7 to about 42,000 centipoises, the viscometer of this invention was able to be calibrated to give accurate measures of shear stress over ranges from about 5 to about 20,000 lbs./ft.$^2$. The precision of measurement of the velocity of the fluid in this apparatus is about 1 in 400 over the entire range of shear rates when the proper choice of capillary size and $L/D$ ratio is made. The device of this invention can also be employed to measure, indirectly, the bulk velocity of the test fluid employing fluid sample volumes as small as 3 cc.

Although the invention has been described in considerable detail with reference to certain preferred embodiments thereof, it will be understood that variations and modifications can be effected within the spirit and scope of the invention as described hereinabove.

What is claimed is:

1. A capillary viscometer adapted to measure precisely the bulk velocity of a test fluid at shear rates of 0.01 to 1,000,000 sec.$^{-1}$ and while under pressures of up to 1,000 p.s.i., comprising a capillary tube having an upstream end and a downstream end, the upstream end being connected to a source of pressurized inert fluid and the downstream end being directly connected to the high pressure leg of a manometer filled with a suitable manometric liquid; means for introducing into said capillary tube a sample of said test fluid to be directly supported on said manometric liquid; means for controlling the temperature of said test fluid while in said capillary tube; means for controlling and measuring the pressure on said test fluid as it is being forced by super atmospheric pressure through said capillary tube by said inert fluid; and means for accurately measuring the bulk velocity of the manometric liquid in the low pressure leg of the manometer as said test fluid is forced through said capillary tube by the pressure of said inert fluid.

2. The viscometer of claim 1, wherein said inert fluid is a gas and said manometric liquid is mercury.

3. The viscometer of claim 1, wherein said means for measuring the velocity of the manometric liquid comprises two photoelectric cells located in spaced relationship along said low pressure leg and connected to a mechanism for measuring the exact moment the meniscus of the manometric liquid passes each of the two photoelectric cells.

4. The viscometer of claim 1 wherein said test fluid is a non-Newtonian liquid.

References Cited

UNITED STATES PATENTS

| | | | |
|---|---|---|---|
| 3,071,961 | 1/1963 | Heighl et al. | 73—55 |
| 3,081,621 | 3/1963 | De Bruyne | 73—55 |
| 3,286,511 | 11/1966 | Harkness | 73—55 |

LOUIS R. PRINCE, *Primary Examiner.*

J. W. ROSKOS, *Assistant Examiner.*

U.S. Cl. X.R.

73—55